US008832050B2

(12) United States Patent
Binkert et al.

(10) Patent No.: US 8,832,050 B2
(45) Date of Patent: Sep. 9, 2014

(54) VALIDATION OF DISTRIBUTED BALANCED TREES

(75) Inventors: Nathan L. Binkert, Redwood City, CA (US); Wojciech Golab, Mountain View, CA (US); Indrajit Roy, Mountain View, CA (US); Mehul A. Shah, Saratoga, CA (US); Benjamin A. Sowell, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 140 days.

(21) Appl. No.: 13/416,603

(22) Filed: Mar. 9, 2012

(65) Prior Publication Data
US 2013/0238576 A1 Sep. 12, 2013

(51) Int. Cl.
*G06F 17/30* (2006.01)

(52) U.S. Cl.
USPC .......................................... 707/695

(58) Field of Classification Search
USPC .......................................... 707/695
See application file for complete search history.

(56) References Cited

U.S. PATENT DOCUMENTS

| | | | |
|---|---|---|---|
| 6,138,123 A | 10/2000 | Rathbun | |
| 6,457,065 B1 * | 9/2002 | Rich et al. | 719/328 |
| 6,484,172 B1 | 11/2002 | Lee et al. | |
| 7,933,881 B2 * | 4/2011 | Richey et al. | 707/704 |
| 8,244,691 B1 * | 8/2012 | Ramarao | 707/692 |
| 8,296,398 B2 * | 10/2012 | Lacapra et al. | 709/219 |
| 2004/0044702 A1 * | 3/2004 | Ferreira Alves et al. | 707/203 |
| 2004/0267813 A1 * | 12/2004 | Rivers-Moore et al. | 707/104.1 |
| 2005/0027797 A1 * | 2/2005 | San Andres et al. | 709/203 |
| 2005/0114862 A1 * | 5/2005 | Bisdikian et al. | 718/105 |
| 2006/0206537 A1 * | 9/2006 | Chiang | 707/200 |
| 2007/0118547 A1 * | 5/2007 | Gupta et al. | 707/101 |
| 2007/0136341 A1 * | 6/2007 | Schopp | 707/101 |
| 2007/0219999 A1 * | 9/2007 | Richey et al. | 707/8 |
| 2010/0175124 A1 * | 7/2010 | Miranda | 726/13 |
| 2010/0306222 A1 * | 12/2010 | Freedman et al. | 707/759 |
| 2011/0060779 A1 * | 3/2011 | Lemar et al. | 707/830 |
| 2011/0238667 A1 * | 9/2011 | Deschler et al. | 707/741 |
| 2012/0324472 A1 * | 12/2012 | Rossbach et al. | 718/106 |

FOREIGN PATENT DOCUMENTS

WO WO-01/44987 A2 6/2001

OTHER PUBLICATIONS

Chang et al., "Bigtable: A Distributed Storage System for Structured Data," Nov. 6-8, 2006, 14 p.
Cosway, P.R., "Replication Control in Distributed B-Trees," Feb. 1997, 140 p.
Wu et al., "Efficient B-tree Based indexing for Cloud Data Processing," Proceedings of the VLDB Endowment, vol. 3, No. 1, Sep. 2010, 12 p.

* cited by examiner

*Primary Examiner* — Noosha Arjomandi

(57) ABSTRACT

A distributed balanced tree having a plurality of nodes distributed across a plurality of servers is accessed. Version information associated with a node of the distributed balanced tree is retrieved. Validity of a lookup transaction performed on the balanced tree is determined by verifying a version value of only the leaf node accessed during the lookup operation against the retrieved version information.

15 Claims, 3 Drawing Sheets

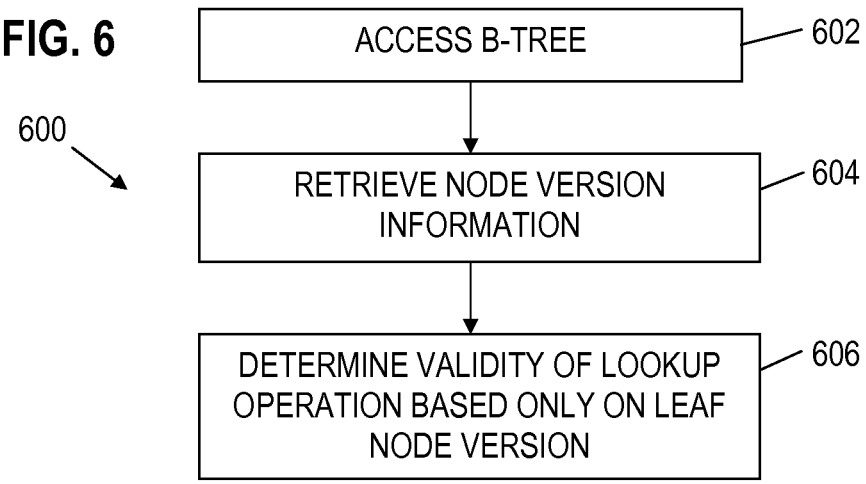
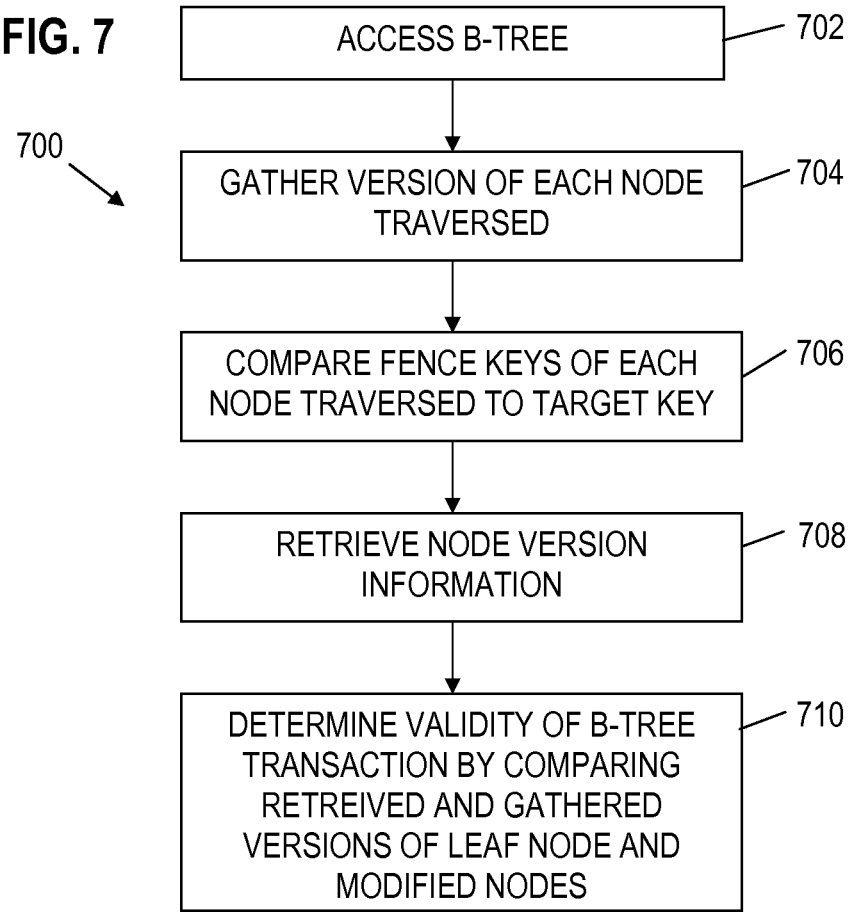

VALIDATION OF DISTRIBUTED BALANCED TREES

BACKGROUND

A B-tree is a type of a search tree that supports insertion, lookup, deletion, and other types of operations such that data access operations with respect to a storage infrastructure are made more efficient. A B-tree is made up of a tree of nodes, including a root node, intermediate or internal nodes, and leaf nodes. Values associated with keys are stored at all tree nodes in a conventional B-tree, and only at leaf nodes in a B+-tree, which is a special type of B-tree The internal nodes (non-leaf nodes) of any B-tree contain pointers to lower-level nodes in addition to keys, which for internal nodes are called separator keys. A search for a particular key performed with a B-tree starts at the root node, and the B-tree is traversed from top to bottom. Once the leaf node with the particular key is found, then the value associated with the key can be retrieved. B-trees can be used in distributed storage and search systems.

BRIEF DESCRIPTION OF THE DRAWINGS

For a detailed description of exemplary embodiments of the invention, reference will now be made to the accompanying drawings in which:

FIG. 6 shows a flow diagram for a method for accessing a B-tree in accordance with principles disclosed herein; and FIG. 7 shows flow diagram for a method for accessing a B-tree in accordance with principles disclosed herein.

NOTATION AND NOMENCLATURE

Figure 1:
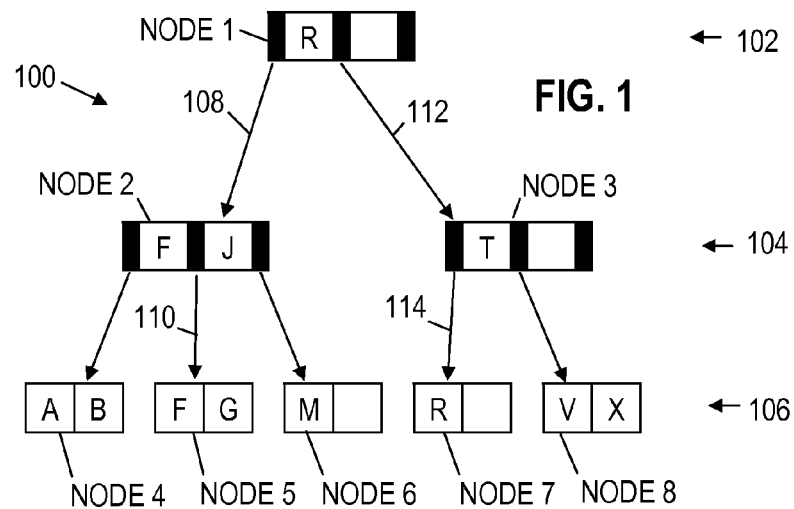
FIG. 1 shows a block diagram of B-tree in accordance with principles disclosed herein.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The recitation "based on" is intended to mean "based at least in part on." Therefore if X is based Y, X may be based on Y and any number of additional factors.

DETAILED DESCRIPTION

The following discussion is directed to various implementations of efficient B-tree access techniques. The principles disclosed herein have broad application, and the discussion of any implementation is meant only to be exemplary of that implementation, and not intended to intimate that the scope of the disclosure, including the claims, is limited to that implementation.

In some storage and/or search systems, a distributed balanced data structure (in the form of a distributed balanced tree) is implemented across multiple hosts. A "host" refers to a machine, such as a computer. In some implementations, the distributed balanced tree includes a distributed B-tree or any variant of a B-tree, such as a B+-tree. A "B-tree" thus refers to a B-tree or any of its variants. The distributed B-tree stored in multiple hosts is accessible by clients that desire to perform certain operations on the B-tree. The hosts storing the distributed B-tree are also referred to as "servers." A "client" refers to a computing device or a computing device executing a software process that desires to access (lookup, insert, delete, etc.) the distributed B-tree for the purpose of performing an operation, such as a storage access operation.

A data structure is distributed if the data structure is stored on different hosts in a network. A data structure is balanced if the depth of each leaf is within one level of each other leaf. A data structure which has a logarithmic number of levels is often efficient for retrievals. A data structure is ordered if there is an efficient way to navigate through the elements of the data structure according to some order with respect to a key that is being searched. A "key" refers to some attribute that is used to sort or identify corresponding data records.

A distributed balanced tree according to some implementations maintains version numbers for nodes in the tree. The version number of a node in the tree is updated whenever a change is made to the node. The use of version numbers allows a client accessing the distributed B-tree to efficiently determine whether content of any node has changed since the last time the client accessed the node. Thus, version numbers are useful for maintaining consistency of the distributed B-tree such that multiple concurrent operations do not corrupt the internal organization of the distributed B-tree. In particular, this technique is used in implementations that include optimistic concurrency control. More generally, "version information" is associated with a node of the distributed B-tree, where version information refers to a version value that increases or decreases with modification, a timestamp reflecting a time of change, a hash of content of the node, or any other information or sequence of bits that change when the content of the node changes.

When traversing the distributed B-tree to execute an operation such as lookup, insert, delete, update, and so forth, the version numbers of nodes that are traversed during the operation are collected. These version numbers can be checked later to determine whether content of one or more nodes of the tree has changed during the operation. A change to any particular node of the tree during a particular operation indicates that content of nodes retrieved during the traversal of the tree may no longer be valid.

Some distributed B-trees cache at least some nodes of the tree at clients. Clients can then access the cached nodes when traversing the distributed B-tree such that the number of accesses of servers can be reduced. Reducing accesses of servers by clients reduces network congestion and processing loads on servers. Unfortunately, cached nodes must be updated when the node being cached is modified which may reduce overall performance of the B-tree.

Version numbers of nodes can be replicated at various servers so that the version numbers are available at more locations, thereby reducing the likelihood of any server being a bottleneck. Unfortunately, version number replicas must be updated when the replicated node version number changes which may impair performance.

In addition, the distributed B-tree may support "multi-operation transactions." Multi-operation transactions are transactions that include a sequence of one or more insert operations, one or more delete operations, and/or one or more update operations. For example, a multi-operation transaction allows for the transaction to atomically insert a key into the distributed B-tree and to remove another key from the distributed B-tree. A multi-operation transaction is thus a sequence of operations (that cause modification and/or retrieval of nodes of a distributed B-tree) that can be performed on the distributed B-tree as a single, indivisible (atomic) transaction.

One scalability issue encountered with B-trees pertains to concurrency control. A B-tree concurrency issue is described with reference to FIG. 1, which shows an example of a B-tree 100 in accordance with the principles disclosed herein. The B-tree 100 includes a root node (node 1) at level 102, and leaf nodes (nodes 4-8) at level 106. The leaf nodes store respective pairs of keys and associated values. For compactness, FIG. 1 does not show the values associated with the keys. The intermediate level 104 includes intermediate nodes (2, 3) between the root node and the leaf nodes.

Each level holds several keys in increasing order (from left to right in FIG. 1), and has pointers (except at the lowest level 106 corresponding to the leaf nodes) to the next level. To look up a key, for example key G in FIG. 1, which can be specified in a search request, the operation starts at the root node 1 and follows the leftmost edge 108 from the root node since G<R and R is the leftmost separator key at the root node. The edge traversed by the operation is based on a comparison of the key G and the separator keys stored in node 1 (in this case key R). The appropriate pointer stored in node 1 is then used to traverse to the next lower level of the B-tree 100. In this example, the pointer points to the leftmost edge 108 to cause the operation to traverse to node 2. The operation then follows the middle edge 110 from node 2, since G is between F and J (the keys stored in node 2). The operation finally arrives at the node 5, where the key G is found.

To insert a key, for example key S, the same procedure to look up S is first performed to find the leaf node where S would have been (note that the B-tree 100 does not contain key S). In FIG. 1, the operation starts at root node 1 and follows the second edge 112 since S>R, to node 3. The operation then follows the first edge 114 from node 3 since S<T, and T is the leftmost separator key in node 3. The operation arrives at leaf node 7. Since the leaf node has an empty slot, key S (which is not yet in the B-tree 100) is inserted into the tree by simply adding key S to leaf node 7, next to key R.

Figure 2:
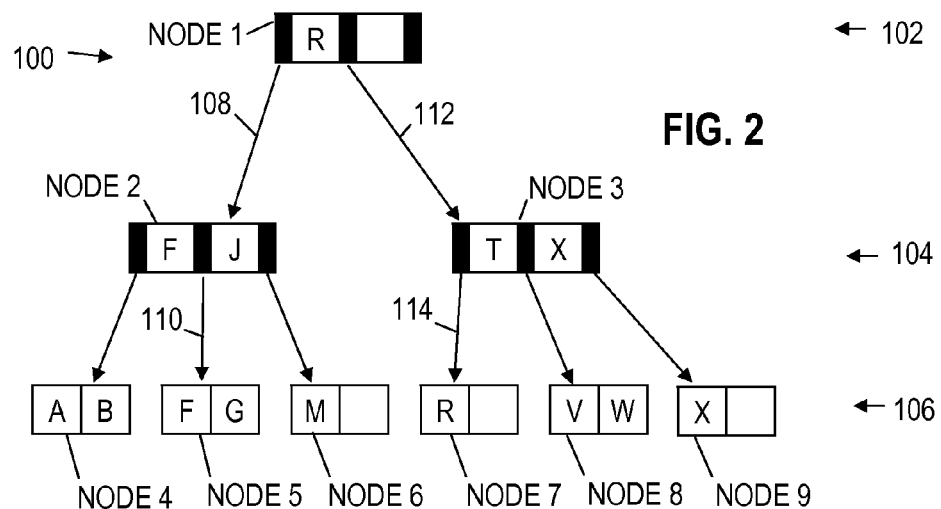
FIG. 2 shows a block diagram of the B-tree following key insertion in accordance with principles disclosed herein.

In another example, to insert key W, by following the procedure to look up W, the operation arrives at leaf node 8. But there is no room to insert key W into node 8 since all slots in node 8 are already occupied. As a result, node 8 has to be split into two nodes (node 8 and new node 9, as illustrated in FIG. 2). Also, the parent node 3 is modified by adding the separator key X and a pointer to the new node 9 in FIG. 2.

Concurrency issues arise when two operations are simultaneously performed on a path of the B-tree 100, and one of the operations modifies a node of the path. In implementations of a B-tree client that validates the entire path from root to leaf optimistically, modification of a node on the path can cause a lookup transaction to fail. Referring again to FIG. 1, if a first transaction (T1) looks up R concurrently with a second transaction (T2) which inserts key W, then the following may occur. T2 visits nodes 1, 3 and 8, sees that 8 is full, and is about to split 8. T1 visits nodes 1 and 3, and is about to perform a final step in which it fetches 7 and validates 1 and 3. At this point T2 performs its final step—it validates nodes 1, 3, and 8, splits node 8, creates node 9 and updates node 3. Finally T1 performs its final step—it attempts to validate 1 and 3, and fetch 7. The validation by T1 fails because T2 has changed node 3. Thus T2 causes T1 to abort, even though T1 correctly reaches node 7 and finds key R. In other words, false sharing occurs between T1 and T2 that may cause transaction T1 to be needlessly repeated.

Storage/search system clients that operate in accordance with principles disclosed herein, avoid the particular type of false sharing described above, and the associated unnecessary system performance degradation, by limiting validation to only those nodes relevant to a transaction. Thus, when performing a look-up transaction, a client may validate only the leaf node revision. When performing an insertion or deletion transaction, a client may validate only the revisions of nodes modified by the transaction (e.g., the leaf node and any internal nodes whose state changes due to B-tree splits or other node modifications).

To ensure that a client reaches the correct leaf node without validating the entire path, the nodes of the B-tree 100 may include a pair of fence keys that indicate the range of key values supported and/or reachable by the node. For example, without the fence keys, a lookup for key X that is concurrent with T2 in the above example may mistakenly land on node 8 in FIG. 2 instead of node 9, and conclude erroneously that X is not in the tree. To avoid this error, at each point in the traversal, the client compares the fence keys at the node visited against the search key. If the search key is outside the key range indicated by the fence keys, the client may, for example, continue the traversal at the appropriate sibling B-tree node, or abort the operation and validate all the nodes visited during the traversal.

Figure 3:
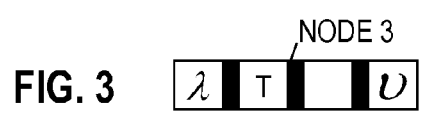
FIG. 3 shows a block diagram of a node including fence keys in accordance with principles disclosed herein.

FIG. 3 shows a block diagram of a node (node 3 of FIGS. 1-2) including fence keys in accordance with principles disclosed herein. A lower fence key ($\lambda$) defines the lower limit of key values supported and/or reachable via the node. An upper fence key ($\upsilon$) defines the upper limit of key values supported and/or reachable via the node. For example, the minimum key supported by the node may be greater than or equal to the lower fence key, and the maximum key supported by the node may be less than or equal to the upper fence key. Each node of the B-tree 100 may include the fence keys $\lambda$ and $\upsilon$.

Examples of the B-tree client disclosed herein may also provide improved transaction performance by implementing a one-phase validation for transactions. The one-phase validation reduces transaction time and node lock interval when compared to clients that apply two-phase validation. In one-phase validation, each B-tree node to be validated is read from the server independently of the others, and then the version read is compared against the version recorded during tree traversal. (Nodes co-located on the same sever can be read in one batch.) This enables validation using only one round-trip time (RTT, i.e., time required for server request and response) or phase. In one-phase validation, the servers lock the B-tree nodes being validated for a very short period of time (i.e., long enough to copy the B-tree node being validated into a buffer), which reduces the likelihood of contention. In contrast, a two-phase atomic transaction uses 1.5 RTT and locks each tree node for 1 RTT.

Figure 4:
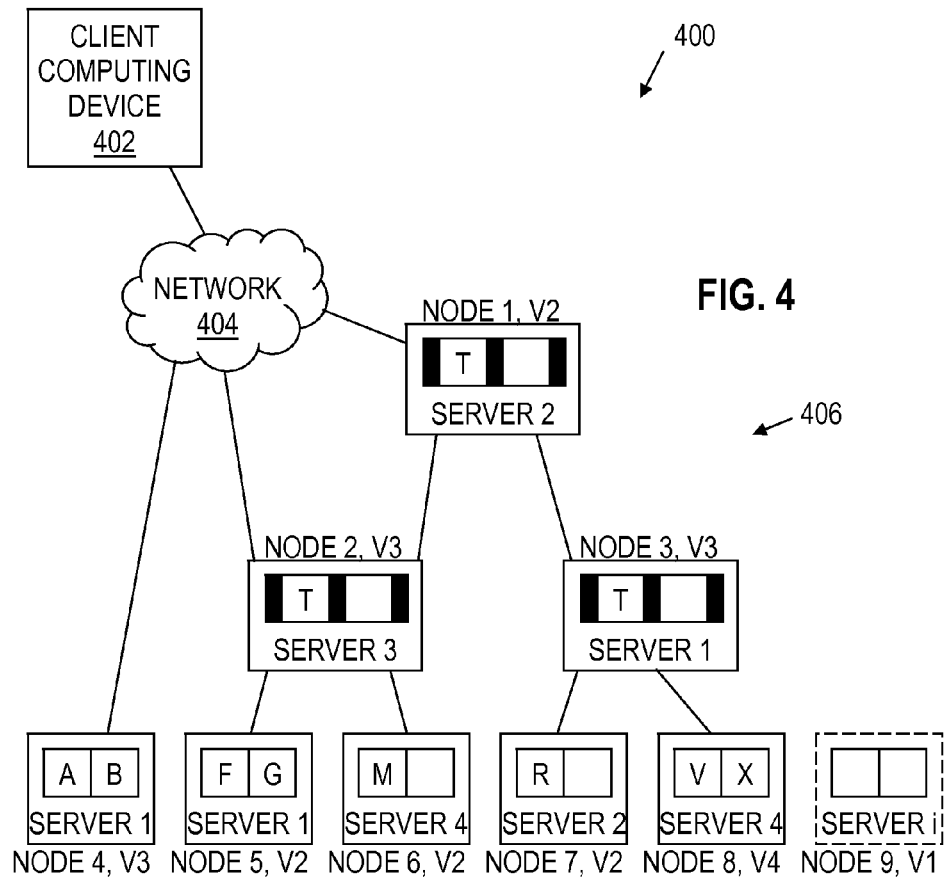
FIG. 4 shows a block diagram of a system to access a B-tree in accordance with principles disclosed herein.

FIG. 4 shows a block diagram of a system 400 to access a distributed B-tree in accordance with principles disclosed herein. The system 400 includes a client computing device 402 coupled to a plurality of servers 406 via the network 404. A distributed B-tree is distributed across the server hosts 406 (labeled servers 1, 2, 3, and 4 in FIG. 4). The terms "host" and "server" are used interchangeably herein. Each pointer (from one node to another node) of a B-tree node includes a host (server) name as well as information used to locate the node within the server, for example an index or offset within the server. Each B-tree node can be at any of the set of servers, and the choice of a particular server is typically made to balance load across the servers. Note that each server 406 can contain more than one B-tree node at more than one level of the B-tree. For example, server 1 contains intermediate node 3 and leaf node 5; server 2 contains root node 1 and leaf node 7; server 3 contains intermediate node 2 and leaf node 4; and server 4 contains leaf nodes 6 and 8. Furthermore, several B-trees or other data structures may be distributed across the same plurality of servers.

The client computing device 402 is coupled via the network 404 to the servers 406. The network 404 may be wired and/or wireless, a local area network, a wide area network, the internet, etc., and combinations thereof. Though only a single client computing device 402 is shown, in practice the system 400 may include any number of client computing devices 402 and any number of servers 406. The client computing device 402 is able to access information in the distributed B-tree.

As explained above, concurrent access of the distributed B-tree by multiple client computing devices 402 can be problematic when one client computing device 402 is modifying a node on a path being used by a different client computing device 402. The client computing device 402 recognizes the level of validation needed to verify each transaction performed to the B-tree, and rather than validating the entire path for each transaction, validates only a subset of the nodes in the path.

To perform a lookup transaction in the B+-tree, the client computing device 402 traverses the tree from the root node (the root node is at a known server) to the correct leaf node by contacting the appropriate servers. After the client computing device 402 has reached the leaf node where the key is supposedly stored, the client computing device 402 may perform a check to ensure that the leaf node version has not changed during the transaction. If the leaf node was fetched directly from the server, the client automatically has the latest copy of the leaf node. On the other hand, if the leaf node is obtained from the client's cache, then the check includes acquiring the version value of the leaf node from the server when the leaf node is reached and comparing the acquired version value against the version read from the client's cache. The client computing device 402 compares the two version values and if the version values are equal, the lookup transaction is deemed successful. If the versions values are different, then the client computing device 402 may reinitiate the lookup transaction from the root node. By validating only the leaf node, the client computing device 402 reduces overall transaction time and avoids needless access retries related to false sharing that may occur if the entire path is validated.

The nodes of the B-tree are not modified by lookup transactions. Consequently, validation of the access leaf node is sufficient to verify a lookup transaction. Insertion and deletion transactions may modify the nodes of the B-tree. Therefore, when performing an insertion or deletion transaction, rather than validating only the modified leaf node, the client computing node 402 validates each node modified by the transaction. Thus, if only the leaf node is modified, then only the leaf node is validated. If the transaction modifies nodes above the leaf node, then those higher level nodes (e.g., intermediate nodes) are also validated. If validation fails, i.e., node versions change between when the client computing device 402 traverses the tree to the leaf node and when node revisions are retrieved for validation, then the client computing device 402 may reinitiate the transaction. By validating only the modified nodes, the client computing device 402 reduces overall transaction time and avoids needless access retries related to false sharing that may occur if the entire path is validated.

One side-effect of validating fewer than all the nodes in the path from the root to the leaf is that a traversal of the B-tree may end at an incorrect leaf node. This may occur, for example, if a leaf node is split by an insertion transaction that removes a given key from a node after a lookup transaction has established that the given node should contain the key. The client computing device 402 avoids this problem by comparing the fence keys ($\lambda$ and $\upsilon$) at each node visited against the search key (i.e., the key searched for). If the search key is outside the key range indicated by the fence keys, the client either continues the traversal at the appropriate sibling B-tree node, or aborts the operation and validates all the nodes visited during the traversal.

The client computing device 402 performs various manipulations of the nodes of the B-tree, including validation and modification, using atomic operations (e.g., indivisible or uninterruptable operations). Some atomic operations perform a batch of actions using a two-phase protocol. In general, the two-phase protocol includes a first phase that checks the version numbers and locks the appropriate B-tree nodes, while a second phase commits the changes (if the version numbers match) or aborts the changes (if the version numbers do not match), and the releases the locks. Because locks are used, other client computers cannot access nodes while locked and cannot interfere with the processing between the two phases. The two-phase protocol lasts for 1.5 RTT and locks the nodes being manipulated for 1 RTT which may cause other transactions attempting to access the nodes to abort due to contention.

To reduce validation time, the client computing device 402 performs atomic one-phase validation of the B-tree nodes. In some implementations, the client computing device 402 applies one-phase validation to transactions that make no node modifications (e.g., lookup transactions) or modify a single node. As the client computing device 402 traverses the B-tree from root to leaf during a transaction, the client computing device 402 gathers and records the version number of each node. In one-phase validation, for each node to be validated, the client computing device 402 retrieves the version value of the node from the server containing the node and compares the retrieved version value to the recorded version value. Nodes located on the same server be can retrieved in a single operation. Nodes located on different servers can be retrieved independently. Thus, validation of a given node requires only a single RTT and each server locks the node(s) for no more than the time required to generate a copy of the node or a portion thereof (e.g., the version value) for provision to the client computing device 402. Thus, the client computing device 402 reduces validation time and the potential for contention via the one-phase validation protocol.

Figure 5:
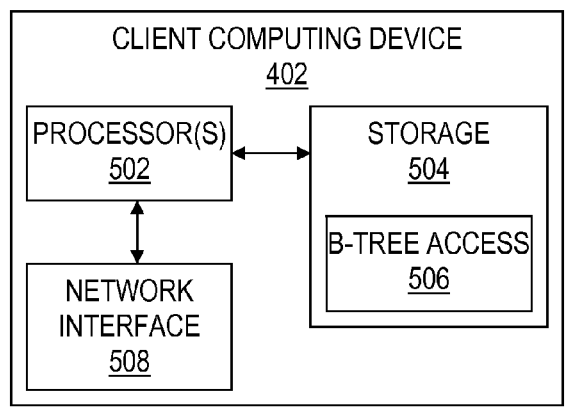
FIG. 5 shows a block diagram of a client computing device to access a B-tree in accordance with principles disclosed herein.

FIG. 5 shows a block diagram of the client computing device 402 in accordance with principles disclosed herein. The client computing device 402 includes a processor 502, storage 504, and a network interface 508. The storage 504 and the network interface 508 are coupled to the processor 502. The processor 502 accesses the network 404 and the servers 406 that contain the B-tree via the network interface 508. The network interface 508 includes circuitry that provides access to any of a variety of communication networks, including local area networks, wide area networks, the internet, etc., and combinations thereof, via wired or wireless media.

The processor(s) 502 may include, for example, one or more general-purpose microprocessors, digital signal processors, microcontrollers, or other suitable devices known in the art. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The storage 504 stores data and/or instructions accessible to the processor(s) 502. The storage 504 is a non-transitory computer-readable storage device and may include volatile storage such as random access memory, non-volatile storage (e.g., a hard drive, an optical storage device (e.g., CD or DVD), FLASH storage, read-only-memory, phase change memory, memristor), or combinations thereof. The storage 504 may also be separate and/or remote from the client computing device 402. The storage 504 includes B-tree access logic 506. The B-tree access logic 506 may take the form of instructions that when executed by the processor(s) 502, cause the processor(s) 502 to access the B-tree formed in the servers 406. For example, the B-tree access logic may cause the processor(s) 502 to perform lookup, insertion, and/or deletion transactions on the B-tree, to validate only leaf nodes and/or modified nodes, and to perform one-phase validation as disclosed herein.

Processors execute software instructions. Software instructions alone are incapable of performing a function. Therefore, any reference to a function performed by software instructions, or to software instructions performing a function is simply a shorthand means for stating that the function is performed by a processor executing the instructions.

FIG. 6 shows a flow diagram for a method 600 for accessing a B-tree in accordance with principles disclosed herein. Though depicted sequentially as a matter of convenience, at least some of the actions shown can be performed in a different order and/or performed in parallel. Additionally, some implementations may perform only some of the actions shown. At least some of the operations of the method 600 can be performed by the processor(s) 502 executing instructions read from a computer-readable medium (e.g., storage 504).

In block 602 the client computing device 402 accesses the B-tree formed in the servers 406. More specifically, the client computing device 402 is performing a lookup transaction (or other type of transaction) and searching for a particular node that contains a specific key value. The client computing device 402 traverses the B-tree from root node to leaf node.

In block 604, the client computing device 402 retrieves the leaf node version information stored at the leaf node. The client computing device 402 may execute a one-phase validation to retrieve the version information.

In block 606, the client computing device 402 determines the validity of the lookup transaction based only on the version of the leaf node.

FIG. 7 shows a flow diagram for a method 700 for accessing a B-tree in accordance with principles disclosed herein. Though depicted sequentially as a matter of convenience, at least some of the actions shown can be performed in a different order and/or performed in parallel. Additionally, some implementations may perform only some of the actions shown. At least some of the operations of the method 700 can be performed by the processor(s) 502 executing instructions read from a computer-readable medium (e.g., storage 504).

In block 702, the client computing device 402 accesses the B-tree as described above with regard to block 602 of method 600. As the client computing device 402 traverses the B-tree, the client computing device 402 gathers and records the version value of each node accessed in block 704.

In block 706, for each node accessed on the path between the root node and the leaf node, the client computing device 402 compares the values of the upper and lower fence keys of the node to the value of the target key (i.e., the value of the searched for key). If the target key is not within the range of keys indicated by the fence keys, then the client computing device 402 may restart the transaction at the root node or at another node above the current node or inspect the siblings of the current node to identify a node having a key range inclusive of the target key.

In block 708, the client computing device 402 retrieves the version information of the leaf node for a lookup transaction, or retrieves the version information (i.e., version value) of the leaf node and any nodes modified by the transaction for insertion and deletion transactions. The client computing device 402 may execute a one-phase validation to retrieve the version information.

In block 710, the client computing device 402 determines the validity of the B-tree transaction by comparing the only version values of leaf or modified nodes recorded as the tree was traversed to the version values of the same nodes after tree traversal. If the version numbers do not match from one pass to the next, then there was an intervening transaction and the current transaction is abandoned.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   validating a lookup operation by:
      accessing, by a processor, a distributed balanced tree having a plurality of nodes distributed across a plurality of servers;
      retrieving, by the processor, version information associated with a node of the distributed balanced tree; and
      determining, by the processor, in a single round trip to the servers, validity of the lookup operation performed on the distributed balanced tree based on a version value of only the leaf node accessed during the lookup operation and the retrieved version information; and
   validating a transaction that modifies a node by:
      retrieving, by the processor, a version value of each of the nodes modified by the transaction on each of the servers independently of each other of the servers;
      comparing each retrieved version value with a version value acquired while traversing the distributed balanced tree for the transaction; and
      determining, based on results of the comparison, whether the transaction is successful;
   wherein each of the nodes to be validated is locked only while the corresponding server copies the node for retrieval by the processor.

2. The method of claim 1, wherein the determining validity of the lookup operation further comprises verifying that a key value searched for by the lookup operation is within a range of key values stored at the leaf node.

3. The method of claim 1, further comprising comparing, while traversing each node of the distributed tree, a searched for key value to an upper key value and a lower key value of the node that define a range of key values associated with the node.

4. The method of claim 3, further comprising restarting the transaction based on the searched for key value being outside the range of key values associated with the node.

5. The method of claim 1, further comprising determining, by the processor, validity of a transaction performed on the distributed tree that modifies the distributed tree by verifying version values of only nodes modified by the transaction.

6. A computer-readable storage medium encoded with instructions that when executed cause a processor to:
for validation of a lookup operation:
   access a distributed balanced tree having a plurality of nodes distributed across a plurality of servers;
   retrieve version information associated with a node of the distributed balanced tree; and
   validate, in a single round trip to the servers, the lookup operation performed on the balanced tree based on a version value of only a leaf node of the balanced tree reached during the lookup operation and the retrieved version information; and
for validation of a transaction that modifies a node:
   retrieve a version value of each of the nodes modified by the transaction on each of the servers independently of each other of the servers;
   compare each retrieved version value with a version value acquired while traversing the balanced tree for the transaction; and
   determine, based on results of the comparison, whether the transaction is successful;
   wherein each of the nodes to be validated is locked only while the corresponding server copies the node for retrieval by the processor.

7. The computer-readable storage medium of claim 6, wherein the instructions further cause the processor to verify that a key value searched for by the lookup operation is within a range of key values stored at the leaf node.

8. The computer-readable storage medium of claim 6, wherein the instructions further cause the processor to compare, while traversing each node of the balanced tree, a searched for key value to an upper key value and a lower key value of the node that define a range of key values associated with the node.

9. The computer-readable storage medium of claim 6, wherein the instructions further cause the processor to determine validity of an operation performed on the balanced tree that modifies a leaf node by verifying a version value of only nodes modified by the operation.

10. The computer-readable storage medium of claim 6, wherein the instructions further cause the processor to validate a transaction performed on the balanced tree in a single round trip to the servers.

11. A system, comprising:
balanced tree access logic; and
a processor to:
   access a distributed balanced tree having a plurality of nodes distributed across a plurality of servers;
   retrieve version information associated with a node of the distributed balanced tree; and
   validate, in a single round trip to the servers, a lookup operation performed on the balanced tree based on a version value of only a leaf node of the balanced tree reached during the lookup operation and the retrieved version information;
wherein the balanced tree access logic is to, in determining validity of a transaction performed on the distributed balanced tree that modifies a node:
   retrieve a version value of each of the nodes modified by the transaction on each of the servers independently of each other of the servers;
   compare each retrieved version value with a version value acquired while traversing the balanced tree for the transaction; and
   determine, based on results of the comparison, whether the transaction is successful;
   wherein each of the nodes to be validated is locked only while the corresponding server copies the node for provision to the balanced tree access logic.

12. The system of claim 11, wherein the balanced tree access logic is to verify that a key value searched for by the lookup operation is within a range of key values stored at the leaf node.

13. The system of claim 11, wherein the balanced tree access logic is to compare, while traversing each node of the balanced tree, a searched for key value to an upper key value and a lower key value of the node that define a range of key values reachable via the node.

14. The system of claim 13, wherein the balanced tree access logic is to restart the transaction based on the searched for key value being outside the range of key values reachable via the node.

15. The system of claim 11, wherein the balanced tree access logic is to determine validity of a transaction performed on the balanced tree that modifies a leaf node by verifying a version value of only nodes modified by the transaction.

* * * * *